US010652626B2

(12) United States Patent
Desmauts et al.

(10) Patent No.: US 10,652,626 B2
(45) Date of Patent: May 12, 2020

(54) GATEWAY, AND METHOD, COMPUTER PROGRAM AND STORAGE MEANS CORRESPONDING THERETO

(71) Applicant: BROADPEAK, Rennes (FR)

(72) Inventors: Jeremy Desmauts, Rennes (FR); Jacques Le Mancq, Rennes (FR); Jean-François Martin, Rennes (FR)

(73) Assignee: BROADPEAK, Rennes (FR)

(*) Notice: Subject to any disclaimer, the term of this patent is extended or adjusted under 35 U.S.C. 154(b) by 0 days.

(21) Appl. No.: 14/351,623

(22) PCT Filed: Oct. 3, 2012

(86) PCT No.: PCT/EP2012/069525
§ 371 (c)(1),
(2) Date: Jun. 23, 2014

(87) PCT Pub. No.: WO2013/053628
PCT Pub. Date: Apr. 18, 2013

(65) Prior Publication Data
US 2014/0380395 A1     Dec. 25, 2014

(30) Foreign Application Priority Data
Oct. 12, 2011   (FR) ..................... 11 59212

(51) Int. Cl.
*H04N 21/647* (2011.01)
*H04L 29/06* (2006.01)
(52) U.S. Cl.
CPC ..... *H04N 21/64738* (2013.01); *H04L 65/103* (2013.01); *H04L 65/1069* (2013.01);
(Continued)

(58) Field of Classification Search
CPC ........... H04N 21/2343; H04N 21/4345; H04N 21/4227; H04N 21/41407; H04N 21/4621;
(Continued)

(56) References Cited

U.S. PATENT DOCUMENTS 6,259,701 B1 * 7/2001 Shur ................... H04L 65/1069
370/252
6,418,138 B1    7/2002 Cerf et al.
(Continued)

FOREIGN PATENT DOCUMENTS

WO     WO-2012018337 A1 * 2/2012 ......... H04L 12/1877

OTHER PUBLICATIONS

Translation of the Written Opinion of the International Searching Authority for PCT/EP2012/069525, 6 pages.
(Continued)

*Primary Examiner* — Chenea Davis
(74) *Attorney, Agent, or Firm* — Nixon & Vanderhye, P.C.

(57) ABSTRACT

A gateway connects a first communication network comprising at least one terminal intended to consume multimedia contents and a second communication network via which the gateway is intended to receive the multimedia contents in a stream form. The gateway detects (400) a use of a unicast connection intended for transmitting a multimedia content from an original server to a terminal of said network via the gateway; seeks (403) a connection redirection rule according to information exchanged by the original server and the terminal; establishes (406) a multicast connection in order to receive the multimedia content; receives (407) the multimedia content in the form of a stream according to the
(Continued)

multicast connection; and transmits (409) to the terminal the multimedia content in the form of a stream according to the unicast connection.

11 Claims, 4 Drawing Sheets

(52) U.S. Cl.
CPC ...... *H04L 65/4076* (2013.01); *H04L 65/4084* (2013.01); *H04L 65/605* (2013.01); *H04N 21/64761* (2013.01)

(58) Field of Classification Search
CPC ........... H04N 21/2543; H04N 21/2365; H04N 21/6332; H04N 21/2402; H04N 21/45; H04N 21/654; H04N 21/647; H04N 21/262; H04N 21/485; H04N 21/254; H04N 21/274; H04N 21/454; H04N 21/8545; H04N 21/4307; H04N 21/2662; H04N 21/103; H04N 21/64761; H04N 21/64738; H04L 65/605; H04L 65/4076; H04L 65/1069; H04L 65/4084
USPC ......... 725/116, 25, 146, 118, 87, 54, 38, 14, 725/95–97, 28, 59, 62, 110, 18, 37, 35, 725/30, 89, 46, 91, 98, 32
See application file for complete search history.

(56) References Cited

U.S. PATENT DOCUMENTS

| | | | |
|---|---|---|---|
| 7,986,702 B1* | 7/2011 | Reister | H04H 60/82 370/312 |
| 2005/0180440 A1* | 8/2005 | Perrot | H04L 12/1877 370/401 |
| 2005/0198097 A1 | 9/2005 | Kalnitsky | |
| 2011/0119387 A1 | 5/2011 | Keller et al. | |
| 2012/0072731 A1* | 3/2012 | Winograd | G06F 21/10 713/176 |

OTHER PUBLICATIONS

International Search Report for PCT/EP2012/069525 dated Nov. 6, 2012.
Written Opinion of the International Searching Authority dated Nov. 6, 2012.

\* cited by examiner

GATEWAY, AND METHOD, COMPUTER PROGRAM AND STORAGE MEANS CORRESPONDING THERETO

This application is the U.S. national phase of International Application No. PCT/EP2012/069525 filed 3 Oct. 2012 which designated the U.S. and claims priority to FR 1159212 filed 12 Oct. 2011, the entire contents of each of which are hereby incorporated by reference.

The present invention concerns a gateway suitable for connecting a first communication network comprising at least one terminal intended to consume multimedia contents and a second communication network via which said gateway is intended to receive said multimedia contents in stream form.

The democratisation of multimedia content broadcast in stream form, and in particular by live streaming, has considerably increased the consumption of the resources of communication networks, and in particular internet infrastructures. This increased consumption is in particular due to the proliferation of the suppliers of multimedia contents, who distribute their multimedia contents in unicast mode.

The explosion of these offers of multimedia contents poses the problem of the congestion of communication networks. This is because simultaneous access by a large number of subscribers to unicasts causes congestion at these communication networks.

It is desirable to provide a solution that reduces the consumption of resources of communication networks in which multicasts of multimedia contents are requested.

It is in particular desirable to provide a solution that is simple to implement and at low cost.

The invention concerns a gateway suitable for connecting a first communication network comprising at least one terminal intended to consume multimedia contents and a second communication network via which said gateway is intended to receive said multimedia contents in stream form. The gateway is such that it comprises: means for detecting use of a unicast connection intended for transmitting a said multimedia content from an original server to a said terminal of said network via said gateway; means for searching for a connection redirection rule according to information exchanged by said original server and said terminal during the use of said unicast connection; means for establishing a multicast connection intended for said gateway in order to receive said multimedia content, used when said redirection rule is found; means for receiving said multimedia content in the form of a stream according to the multicast connection; and means for transmitting to said terminal said multimedia content in the form of a stream according to the unicast connection.

Thus, by redirection by the gateway of a unicast connection as a multicast connection, the consumption of resources in the second communication network is reduced if the multimedia content is already the subject of a multicast (the gateway then merely needing to subscribe to this broadcast) or will be reduced for a future transmission if it is not already the subject of a multicast (the next terminal to request this multimedia content will then be able to benefit from the multicast).

According to a particular embodiment said detection means comprise means for detecting a request to establish the unicast connection transmitted by said terminal to said original server, and said information exchanged is uniform resource location data identifying multimedia content and included in said request.

Thus the redirection can take place before the unicast connection is actually established between the terminal and the original server and the multimedia content has begun to be transmitted.

According to a particular embodiment, the gateway comprises means for transmitting said uniform resource location data to a predetermined server via said second network, and the means for receiving said multimedia content in the form of a stream according to the multicast connection are able to receive said multimedia content coming from said predetermined server.

Thus the uniform resource location data enable the predetermined server to identify the multimedia content and optionally the original server from which the multimedia content is available. Thus, if the original server does not have multicast capabilities, this can be used by the predetermined server after any recovery of the multimedia content from the original server.

According to a particular embodiment, said detection means comprise: means for receiving, coming from said original server, said multimedia content in the form of a stream according to the unicast connection; and means for obtaining, from said stream according to the unicast connection, fingerprint, signature or digital watermarking data identifying said multimedia content. Furthermore, said information exchanged is said fingerprint, data or digital watermarking data.

Thus it is possible to identify the multimedia content even if the exchanges between the original server and the terminal for establishing the unicast connection have not made it possible to achieve this.

According to a particular embodiment, the gateway comprises means for associating said fingerprint, signature or digital watermarking data and uniform resource location data included in a request to establish the unicast connection transmitted by said terminal to said original server, in order to define a new connection redirection rule.

Thus it is possible to enhance the connection redirection rules. The next time that a gateway will have to make a connection for this multimedia content, the redirection will be able to take place following an interception of the request for establishment of unicast connection by the terminal.

According to a particular embodiment, the gateway comprises means for transmitting said fingerprint, signature or digital watermarking data to a predetermined server via said second network, and the means for receiving said multimedia content in the form of a stream according to the multicast connection are suitable for receiving said multimedia content coming from said predetermined server.

According to a particular embodiment, the multimedia content being broadcast in the form of an adaptive stream, the gateway comprises means for modifying the manifest indicating the bitrates at which said multimedia content is available by suppression of at least one rate.

Thus the reduction in the consumption of resources in the second communication network is reinforced.

The invention also concerns a system comprising at least one gateway as mentioned above in any of the embodiments thereof, and further comprising a server comprising means for obtaining said multimedia content from said original server.

According to a particular embodiment, the system comprises another server comprising a connection redirection rule base, and each gateway comprises means for obtaining connection redirection rules from said other server.

Thus the connection redirection rules can easily be shared by the gateways when several gateways are used.

The invention also concerns a method implemented by a gateway connecting a first communication network comprising at least one terminal intended to consume multimedia contents, and a second communication network via which said gateway is intended to receive said multimedia contents in stream form. The method is such that it comprises the following steps: detection of use of a unicast connection intended for transmission of a said multimedia content from an original server to a said terminal in said first network via said gateway; search for a connection redirection rule according to information exchanged by said original server and said terminal during the use of said unicast connection; establishment of a multicast connection intended for said gateway for transmitting said multimedia content; reception of said multimedia content in the form of a stream according to the multicast connection; transmission of said multimedia content to said terminal in the form of a stream according to the unicast connection.

The invention also concerns a computer program that can be stored on a medium and/or downloaded from a communication network, in order to be read by a computer system or a processor. This computer program comprises instructions for implementing the method mentioned above when said program is executed by a computer system or a processor. The invention also concerns storage means comprising such a computer program. Since the advantages of this method, computer program and storage means are of the same nature as those mentioned above in relation to the features of the gateway, they will not be repeated.

The features of the invention mentioned above, as well others, will emerge more clearly from a reading of the following description of an example embodiment, said description being given in relation to the accompanying drawings, among which:

Figure 1:
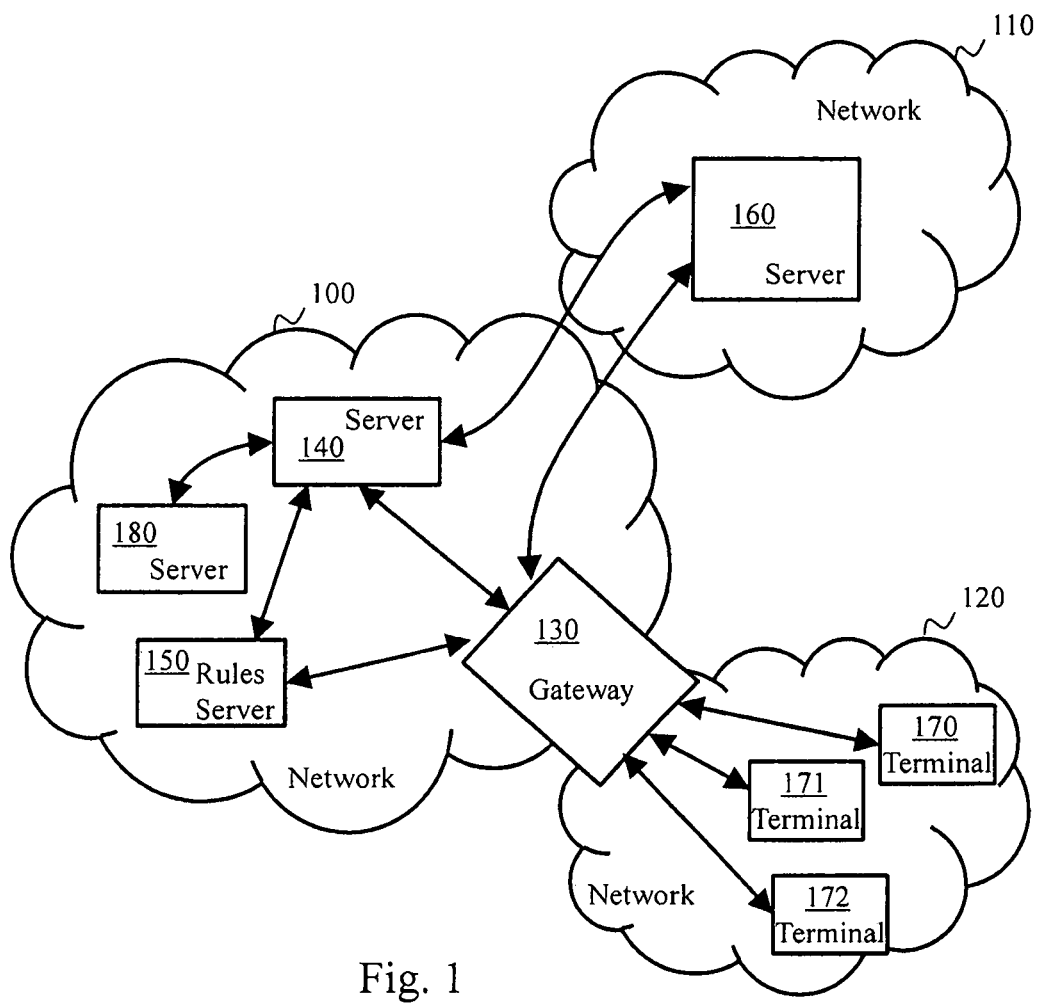
FIG. 1 illustrates schematically the use of a multimedia content transmission system.

The multimedia content transmission system of FIG. 1 comprises at least one gateway 130 and a server 140. Hereinafter this server will be referred to as the "multimedia content server".

The gateway 130 is suitable for connecting a first communication network 120 comprising at least one terminal 170, 171, 172 intended to consume multimedia contents and a second communication network 110 via which the gateway 130 is intended to receive these multimedia contents in a stream form. These terminals may be connected TV (television) equipment, tablets, personal computers (PCs), digital decoders (set top boxes), etc.

An example of hardware architecture of the gateway 130 is illustrated below in relation to FIG. 2.

The first communication network 120 is for example a domestic network of the Ethernet type in accordance with the standard IEEE 802.3 ("*Carrier Sense Multiple Access with Collision Detection (CSMA/CD) Access Method and Physical Layer Specifications*") or of the Wi-Fi type in accordance with the standard IEEE 802.11 ("*Wireless LAN Medium Access Control (MAC) and Physical Layer (PHY) Specifications*"). Other network technologies may be used to implement the first communication network 120.

The second communication network is for example an internet-access network managed by an internet service operator (NSP or "Network Service Provider"). The second communication network 100 is for example a multimedia content supply network (CDN or "Content Delivery Network").

The multimedia content server 140 is suitable for supplying multimedia contents to the terminals 170, 171, 172 in stream form via the gateway 130. An example of hardware architecture of the multimedia content server 140 is illustrated below in relation to FIG. 3.

The multimedia content transmission system of FIG. 1 may further comprise another server 150 comprising a connection redirection rule base. Hereinafter, this other server will be referred to as the "rules server". The rules server 150 is suitable for supplying connection redirection rules to the gateway 130. These connection redirection rules may be requested by the gateway 130, in an operating mode commonly referred to as "pull" mode. These connection redirection rules may be transmitted by the rules server 150 to the gateway 130 without any request from the latter, in an operating mode commonly referred to as "push" mode.

The connection redirection rules may be fixed in advance or defined automatically. The connection redirection rules may be defined automatically by means of the experience acquired by the gateways, such as the gateway 130 and/or the multimedia content server 140. For example, the gateway 130 may indicate that it has downloaded via a given URL ("Uniform Resource Locater") a content comprising digital watermarking data or fingerprint or signature data, which makes it possible to create a new rule associating the content identified by these digital watermarking, fingerprint or signature data and this URL.

Examples of connection redirection rules are provided below in relation to FIGS. 4 and 5. Other connection redirection rules can be applied. For example, a redirection to a multicast connection can be applied according to a file extension the reading of which is requested, according to a predefined list of multimedia contents identified as available on a predetermined multimedia content server following an agreement between the proprietor of the content and the person using the multimedia content transmission system, etc.

FIG. 1 also illustrates a server 180 and a server 160, hereinafter referred to as "original multimedia content servers". The original multimedia content server 180 is situated in the second communication network 100. The original multimedia content server 160 is situated in a third communication network 110. The data exchanges between the second 100 and third 110 communication networks can be done via another gateway connecting these two communication networks. The data exchanges between the second 100 and third 110 communication networks can also be done via a federating communication network, sometimes referred to as an internet backbone or core network depending on the context. The original multimedia content servers 160 and 180 enable the multimedia content server 140 to recover multimedia contents to be transmitted to the terminals 170, 171, 172, as described below in relation to FIG. 6.

Figure 2:
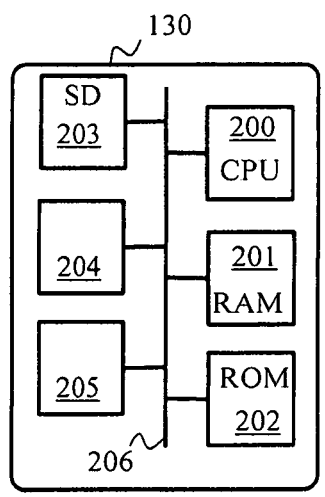
FIG. 2 illustrates schematically a hardware architecture of a gateway of the multimedia content transmission system of FIG. 1.

FIG. 2 illustrates schematically an example of hardware architecture of the gateway 130. The gateway 130 then comprises, connected by a communication bus 206: a processor or CPU (Central Processing Unit) 200; a random access memory (RAM) 201; a read only memory (ROM) 202; a first interface 204 for communication with the first communication network 120; a second interface 205 for communication with the second communication network 100; and a storage unit, such as a hard disk drive (HDD), or a storage medium reader 203, such as an SD card (Secure Digital Card) reader.

The processor 200 is capable of executing instructions loaded into the RAM 201 from the ROM 202, from an external memory (not shown), from a storage medium such as an SD card, or from a communication network. When the gateway 130 is powered up, the processor 200 is capable of reading instructions from the RAM 201 and executing them. These instructions form a computer program causing the use, by the processor 200, of all or some of the algorithms described below in relation to FIGS. 4 and 5.

All or some of the algorithms described below in relation to FIGS. 4 and 5 can be implemented in software form by the execution of a set of instructions by a programmable machine, such as DSP (Digital Signal Processor) or a microcontroller, or be implemented in hardware form by a dedicated machine or component, such as an FPGA (Field-Programmable Gate Array) or an ASIC (Application-Specific Integrated Circuit).

Figure 3:
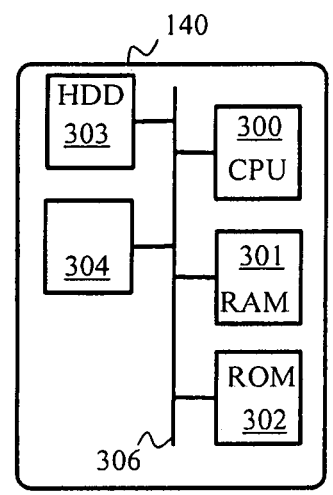
FIG. 3 illustrates schematically a hardware architecture of a multimedia content server of the multimedia content transmission system of FIG. 1.

FIG. 3 illustrates schematically an example of hardware architecture of the multimedia content server 140. The multimedia content server 140 then comprises, connected by a communication bus 306: a processor or CPU 300; a RAM 301; a ROM 302; an interface 304 for communication with the second communication network 100; and a storage unit 303 such as a hard disk HDD or a storage medium reader.

The processor 300 is capable of executing instructions loaded into the RAM 301 from the ROM 302, from an external memory (not shown), from a storage medium such as a hard disk, or from a communication network. When the multimedia content server 140 is powered up, the processor 300 is capable of reading instructions from the RAM 301 and executing them. These instructions form a computer program causing the use, by the processor 300, of all or some of the algorithms described below in relation to FIG. 6.

All or some of the algorithms described below in relation to FIG. 6 can be implemented in software form by the execution of a set of instructions by programmable machine, such as DSP or a microcontroller, or be implemented in hardware form by a dedicated machine or component, such as an FPGA or an ASIC.

Figure 4:
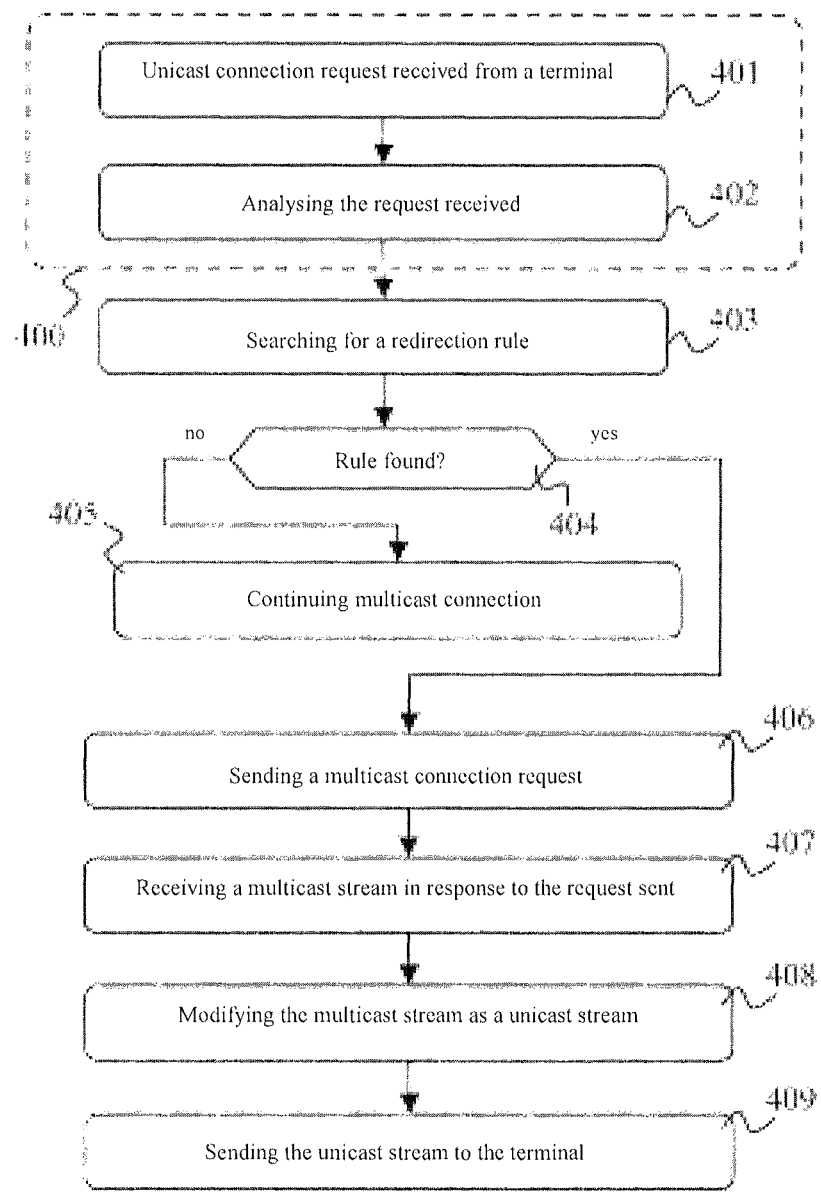
FIG. 4 illustrates a first algorithm used by the gateway.

FIG. 4 illustrates a first algorithm used by the gateway 130.

In a step 401, the gateway 130 receives a request from a terminal 170, 171 or 172. Let us consider that this request is received from the terminal 170. This request is a request to establish a unicast connection with a multimedia content server.

Various communication protocols and more particularly connection establishment protocols can be used in the context of the present invention. Preferentially, the devices shown in FIG. 1 use the IP protocol (Internet Protocol), for example in version 4 (IPv4) defined in the normative document RFC 791 or in version 6 (IPv6) thereof defined in the normative document RFC 2460. In this preferential context, the streams of multimedia contents can be transmitted in the form of User Datagram Protocol (UDO) datagrams defined in the normative document RFC 768. According to a variant embodiment, the streams of multimedia contents can be transmitted in the form of TCP (Transmission Control Protocol) segments defined in the normative document RFC 793.

For example, the request received at step 401 indicates that the terminal 170 requires the establishment of a unicast connection for the transmission of a multimedia content the URL of which is, according to the HTTP (HyperText Transfer Protocol) protocol as defined in the normative document RFC 2616 for version 1.1m, as follows: http://172.2.2.33/monContentuVideo. Other connection protocols can be used, such as for example the RTSP (Real Time Streaming Protocol) protocol.

The request received at step 401 can be send to a multimedia content server present in the second communication network 100, such as the multimedia content server 140 or the original multimedia content server 180, or to a multimedia content server present in the third communication network 110, such as the original multimedia content server 160.

In a following step 402, the gateway 130 proceeds with an analysis of the received request according to the protocol used. During this analysis, the gateway 130 applies a filter to the request received and attempts to recover information exchanged during the use of the unicast connection and serving to identify the multimedia content requested by the terminal 170. In the previous example, the gateway 130 seeks to identify the URL identifying the multimedia content.

For implementing steps 401 and 402, the gateway 130 performs a step 400 of detecting a use of a unicast connection intended for transmission of a multimedia content from a server to the terminal 170 via the gateway 130.

In a following step 403, the gateway 130 seeks a connection redirection rule according to the information recovered during step 402. Each rule defines, according to the filter applied at step 402, an action of connection redirection to a predetermined multimedia content server in the second communication network 100, such as for example the multimedia content server 140.

In a following step 404, the gateway 130 determines whether a rule corresponding to the information recovered at step 402 has been found. If such is the case, a step 406 is performed; otherwise a step 405 is performed, during which the gateway 130 allows continuing the unicast connection. In other words, the gateway 130 transmits the request, via the second communication network 100 to the multimedia content server concerned, and enables the unicast connection to be established between the multimedia content server in question and the terminal 170. The algorithm described below in relation to FIG. 5 can then be applied.

In step 406, the gateway 130 sends a multicast connection request to receive the multimedia content, coming from the predetermined server according to the rule found, in the form of a stream according to a multicast connection.

For example, such a request can be formulated in accordance with the IGMP protocol (Internet Group Management Protocol) or in accordance with the Multicast Listener Discovery protocol, as defined in the normative document RFC 4604. In other words, the gateway 130 establishes a multicast connection intended for the gateway 130 for receiving the multimedia content.

The gateway 130 can transmit a request to the multimedia content server 140, this request comprising an identifier of the multimedia content concerned, in order to use the multicast connection for transmitting the multimedia content. This request may also comprise identification data of the original multimedia content server for which the multimedia content in question is available. For example, the request may contain the URL contained in the request received at step 401.

In a following step 407, the gateway 130 receives the multimedia content in the form of a stream according to the multicast connection established at step 406.

In a following step 408, the gateway 130 modifies the received stream according to the multicast connection in step 407 in order to generate a stream according to the unicast connection requested by the terminal 170 at step 401.

The gateway 130 may subscribe to the multicast stream, receive the corresponding multimedia data, and store and deliver them on demand, in accordance with the HTTP protocol, to the terminal 170.

In a following step 409, the gateway 130 sends the multimedia content to the terminal 170 in the form of a stream generated according to the unicast connection.

Figure 5:
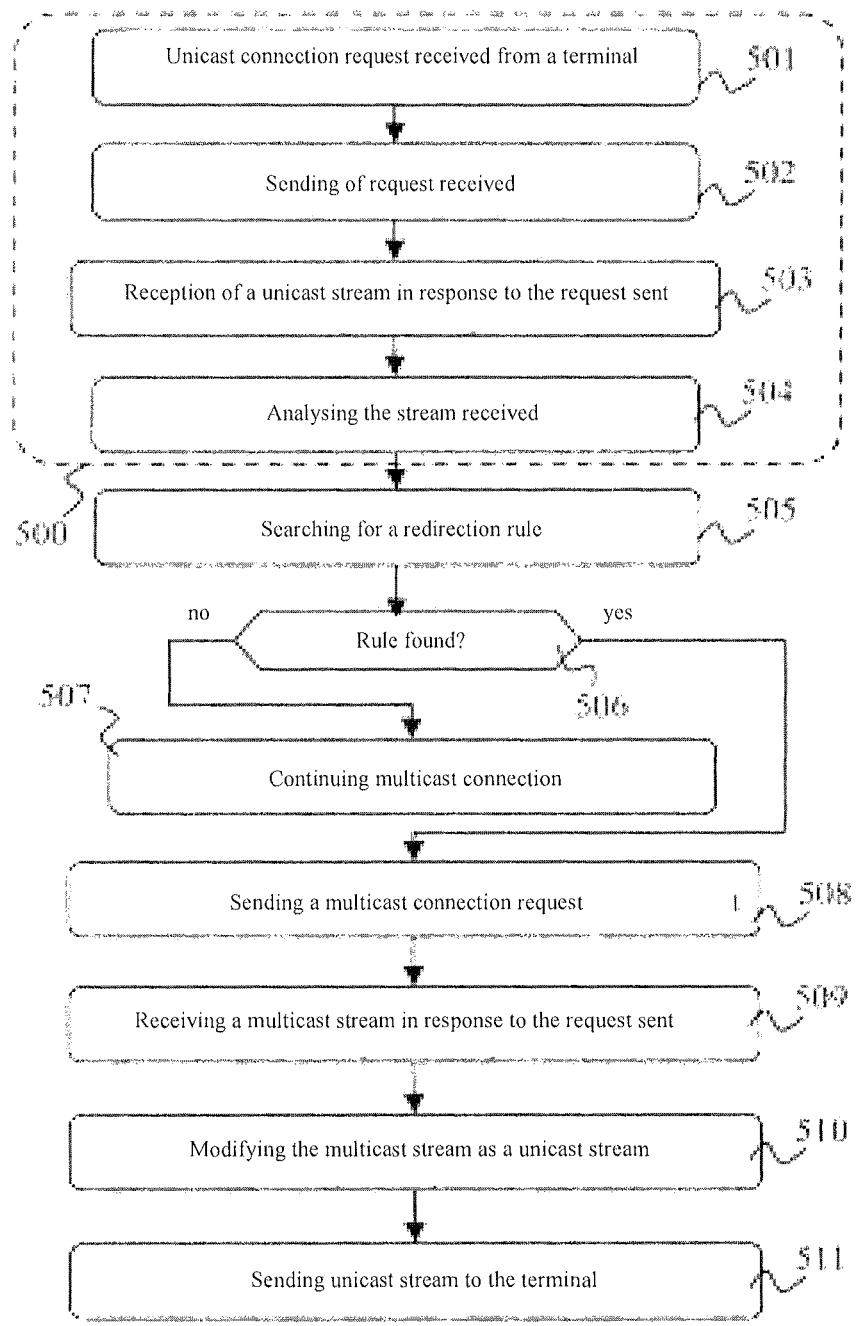
FIG. 5 illustrates a second algorithm used by the gateway.

FIG. 5 illustrates a second algorithm used by the gateway 130. This algorithm may be used in replacement for or in addition to that described in relation to FIG. 4.

In a step 501, the gateway 130 receives a request from a terminal 170, 171 or 172. Let us consider that this request is received from the terminal 170. This request is a request to establish a unicast connection with a multimedia content server.

In a following step 502, the gateway 130 transmits the request, via the second communication network 100, to the multimedia content server concerned, and enables the unicast connection to be established between the multimedia content server in question and the terminal 170, until the gateway 130 begins to receive the multimedia content in the form of a stream according to the unicast connection.

In a following step 503, the gateway 130 begins to receive the multimedia content in the form of a stream according to the unicast connection. The transmission of the stream, and therefore of the content, does not take place as far as the terminal 170 and is stopped by the gateway 130.

In a following step 504, the gateway 130 analyses the stream received and preferentially the multimedia content. During this analysis, the gateway 130 applies a filter to the stream received and attempts to recover information exchanged during the use of the unicast connection and serving to identify the multimedia content requested by the terminal 170. The gateway 130 obtains fingerprint, signature or digital watermarking data from the stream received according to the unicast connection. The fingerprint data are either contained in the stream received, or determined by the gateway 130 from the stream received. The signature data are determined by the gateway 130 from the stream received by applying a hash function to the data of the stream received. The digital watermarking data are contained in the multimedia content and are recovered by the gateway 130.

In a preferential embodiment, the gateway 130 can enhance the connection redirection rule base of the server 150 by providing the server 150 with the fingerprint, signature and digital watermarking data obtained at step 503 in association with a URL contained in the request received from the terminal 170 at step 501.

By implementing steps 501 to 504, the gateway 130 performs a step 500 of detecting a use of a unicast connection intended for transmission of a multimedia content from a server to the terminal 170 via the gateway 130.

In a following step 505, the gateway 130 seeks a connection redirection rule according to the information recovered during step 504. Each rule defines, according to the filter applied at step 504, an action of connection redirection to a predetermined multimedia content server in the second communication network 100, such as for example the multimedia content server 140.

In a following step 506, the gateway 130 determines whether a rule corresponding to the information recovered at step 504 has been found. If such is the case, a step 508 is performed; otherwise a step 507 is performed, during which the gateway 130 allows continuation of the unicast connection. In other words, the gateway 130 relays the multimedia content in the form of a stream according to the unicast connection to the terminal 170.

In step 508, the gateway 130 sends a multicast connection request for receiving the multimedia content, coming from the predetermined server according to the rule found, in the form of a stream according to a multicast connection. In other words, the gateway 130 establishes a multicast connection to the gateway 130 to receive the multimedia content.

The gateway 130 can transmit a request to the multimedia content server 140, this request comprising an identifier of the multimedia content concerned, in order to use the multicast connection for transmitting the multimedia content. This request may also comprise identification data of the original multimedia content server for which the multimedia content in question is available. For example, the request may contain the fingerprint, signature or digital watermarking data, and the URL contained in the request received at step 501.

In a following step 509, the gateway 130 receives the multimedia content in the form of a stream according to the multicast connection established at step 508.

In a following step 510, the gateway 130 modifies the stream received according to the multicast connection in step 509 in order to generate a stream according to the multicast connection requested by the terminal 170 at step 501.

In a following step 511, the gateway 130 transmits the multimedia content to the terminal 170 in the form of the stream generated according to the unicast connection.

Thus, whether it is by use of the algorithm described in relation to FIG. 4 or the one described in relation to FIG. 5, the gateway 130 reduces the resources consumption of the communication network 100. If for example a user activates the terminal 170 in order to view a multimedia content broadcast live by the original content server 160 or 180, the gateway 130 can subscribe to the multicast broadcasting of this same content by the content server 140. Such a content broadcast live is for example a television broadcast of a channel. This operation also takes place in a way that is transparent for the user of the terminal 170.

In a particular embodiment, the gateway 130 may have recourse to a connection redirection or rule for a multimedia content available according to an adaptive streaming format, such as HLS (HTTP live Streaming) developed by the company Apple (registered trademark) or "Smooth Streaming" developed by Microsoft, or DASH (Dynamic Adaptive Streaming over HTTP) described in the ISO/IEC normative document DIS 23009-7.2. Thus the gateway 130 can, apart from redirecting the transmission of the multimedia content to a multicast connection, intercept and modify the manifest describing the bitrates at which the multimedia content is available, so as to eliminate at least one bitrate entered in the manifest. The bitrate or bitrates eliminated is or are preferentially the highest among the bitrates entered in the manifest. Thus the terminal 170 cannot request transmission at this bitrate or bitrates and the consumption of the resources of the communication network 100 is reduced.

Figure 6:
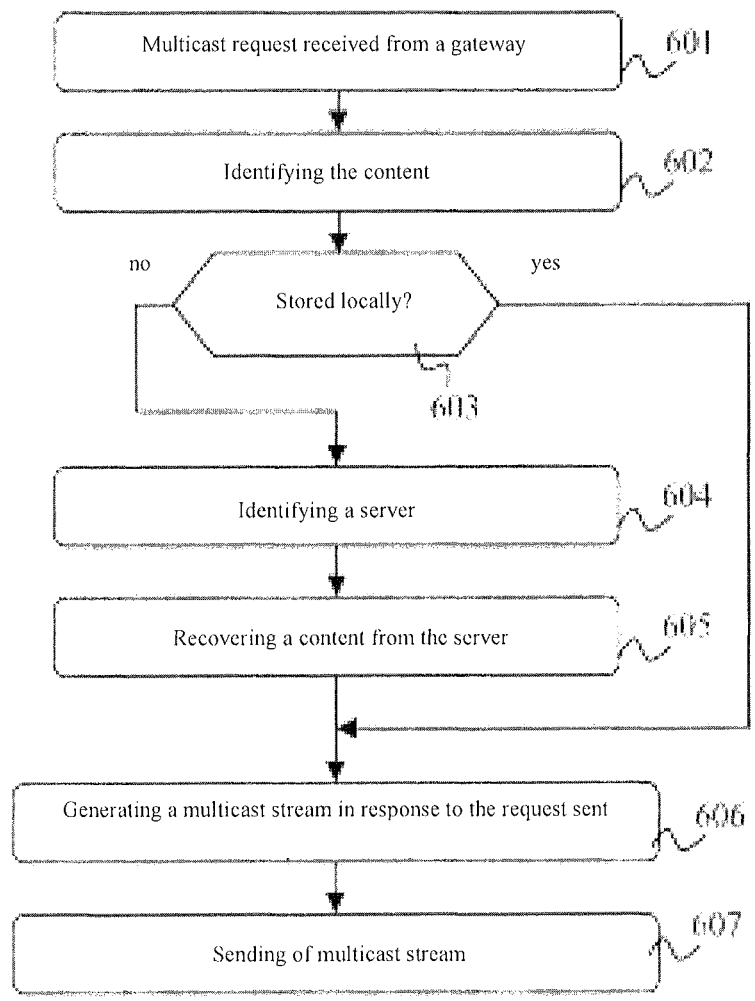
FIG. 6 illustrates an algorithm used by the multimedia content server.

FIG. 6 illustrates an algorithm used by the multimedia content server 140.

In a step 601, the multimedia content server 140 receives a multicast connection request for transmitting a multimedia content coming from a gateway, such as the gateway 130. This request corresponds to the one transmitted by the gateway 130 during step 406 or 508.

In a following step 602, the multimedia content server 140 identifies the multimedia content to which the request relates. The request contains information allowing such identification. For example, the request contains a URL for identifying the multimedia content, or fingerprint, signature or digital watermarking data.

In a following step 603, the multimedia content server 140 determines whether the multimedia content identified is stored locally. If such is the case, a step 606 is performed; otherwise a step 604 is performed, during which the multimedia content server 140 identifies the original multimedia content server through which the multimedia content is available. For example, this identification is contained in the URL transmitted in the request received at step 601.

In a following step 605, the multimedia content server 140 recovers the content from the original multimedia content server identified at step 605. Thus the multimedia content can be made available in multicast mode by the multimedia content server 140, whereas the original multimedia content server can be intended only to broadcast this multimedia content via unicast connections. Next, step 606 is performed.

In step 606, the multimedia content server 140 generates a multicast stream in response to the request received at step 601.

In a following step 607, the multimedia content server 140 establishes the multicast connection with the gateway concerned and transmits the multimedia content to this gateway in the form of the stream generated according to the multicast connection.

The invention claimed is:

1. A gateway configured for connecting a first communication network comprising at least one terminal configured to consume multimedia contents and a second communication network, said gateway being configured to receive said multimedia contents in stream form via said second communication network,
wherein the gateway is further configured for:
detecting an establishment of a unicast connection aiming at transmitting one said multimedia content in said unicast connection from an original server of said second communication network to one said terminal of said first communication network via said gateway, the detection comprising receiving from said terminal a request that is addressed to the original server and that requests the establishment of said unicast connection between the original server of said second communication network and the one said terminal of said first communication network, and analysing the received request, or a stream comprising the multimedia content received after the establishment of the unicast connection between said terminal and said original server, to recover information which is exchanged during the establishment of the unicast connection or respectively in said unicast connection between the original server and said terminal and which serves to identify said multimedia content;
searching for a connection redirection rule according to the recovered information exchanged;
the gateway is configured to, when the connection redirection rule is found, establish a multicast connection toward said gateway in order to receive said multimedia content, receive said multimedia content in stream form according to the multicast connection, and transmit to said terminal said multimedia content in stream form according to the unicast connection; and
the gateway is configured to, when the connection redirection rule is not found, enable the unicast connection between the original server of said second communication network and the one said terminal of said first communication network so that the original server of said second communication network transmits to the one said terminal of said first communication network the multimedia content in unicast form.

2. The gateway according to claim 1, wherein said information exchanged is uniform resource location data identifying said multimedia content and included in said request.

3. The gateway according to claim 2, wherein the gateway is further configured for transmitting said uniform resource location data to a predetermined server via said second communication network, and wherein receiving said multimedia content in stream form according to the multicast connection is receiving said multimedia content coming from said predetermined server.

4. The gateway according to claim 1, wherein detecting the establishment of the unicast connection comprises:
receiving, coming from said original server, said multimedia content in stream form according to the unicast connection; and
obtaining, from said stream form according to the unicast connection, fingerprint, signature or digital watermarking data identifying said multimedia content;
and wherein said information exchanged is said fingerprint, signature or digital watermarking data.

5. The gateway according to claim 4, wherein the gateway is configured for associating said fingerprint, signature or digital watermarking data and uniform resource location data included in a request to establish the unicast connection transmitted by said terminal to said original server, in order to define a new connection redirection rule.

6. The gateway according to claim 4, wherein the gateway is configured for transmitting said fingerprint, signature or digital watermarking data to a predetermined server via said second communication network, and wherein the gateway is configured for receiving said multimedia content in stream form according to the multicast connection from said predetermined server.

7. The gateway according to claim 1, wherein the multimedia content is transmitted in the form of an adaptive stream, and the gateway is configured for modifying a manifest indicating the bitrates at which said multimedia content is available by eliminating at least one bitrate.

8. A system comprising at least one gateway according to claim 1, wherein the system further comprises a server configured for obtaining said multimedia content from said original server.

9. The system according to claim 8, wherein the system comprises another server comprising a connection redirection rule base, and wherein each gateway is configured for obtaining connection redirection rules from said other server.

10. A method implemented by a gateway connecting a first communication network comprising at least one terminal configured to consume multimedia contents and a second communication network, the gateway being configured for receiving said multimedia contents in stream form, wherein the method comprises:
detecting an establishment of a unicast connection aiming at transmitting one said multimedia content in said unicast connection from an original server of the second communication network to one said terminal of said first communication network via said gateway, the detection comprising receiving from said terminal a request that is addressed to the original server and that requests the establishment of said unicast connection between the original server of said second communication network and the one said terminal of said first communication network, and analysing the received request, or a stream comprising the multimedia content received after the establishment of the unicast connection between said terminal and said original server to recover information which is exchanged during the establishment of the unicast connection or respectively in said unicast connection between the original server and said terminal and which serves to identify said multimedia content;

searching for a connection redirection rule according to the recovered information exchanged;

when the connection redirection rule is found, establishing a multicast connection toward said gateway for transmitting said multimedia content, receiving said multimedia content in stream form according to the multicast connection, and transmitting said multimedia content to said terminal in stream form according to the unicast connection; and when the connection redirection rule is not found, enabling the unicast connection between the original server of said second communication network and the one said terminal of said first communication network so that the original server of said second communication network transmits to the one said terminal of said first communication network the multimedia content in unicast form.

11. A computer-readable, non-transitory information storage medium storing a computer program comprising instructions for causing a gateway to receive multimedia contents in stream form, said gateway configured for receiving said multimedia contents in stream form, said computer program, when executed by a processor of said gateway, causes said gateway to provide execution comprises:

detecting an establishment of a unicast connection aiming at transmitting one said multimedia content in said unicast connection from an original server of the second communication network to one said terminal of said first communication network via said gateway, the detection comprising receiving from said terminal a request that is addressed to the original server and that requests the establishment of said unicast connection between the original server of said second communication network and the one said terminal of said first communication network, and analysing the received request, or a stream comprising the multimedia content received after the establishment of the unicast connection between said terminal and said original server, to recover information which is exchanged during the establishment of the unicast connection or respectively in said unicast connection between the original server and said terminal and which serves to identify said multimedia content;

searching for a connection redirection rule according to the recovered information exchanged;

when the connection redirection rule is found, establishing a multicast connection toward said gateway for transmitting said multimedia content, receiving said multimedia content in stream form according to the multicast connection, and transmitting said multimedia content to said terminal in stream form according to the unicast connection; and when the connection redirection rule is not found, enabling the unicast connection between the original server of said second communication network and the one said terminal of said first communication network so that the original server of said second communication network transmits to the one said terminal of said first communication network the multimedia content in unicast form.

\* \* \* \* \*